United States Patent [19]
Hopper

[11] 3,811,641
[45] May 21, 1974

[54] PRECESSION CONTROL DEVICE FOR A CLASS OF SPIN STABILIZED SPACE VEHICLES

[75] Inventor: Frederick W. Hopper, Littleton, Colo.

[73] Assignee: Martin Marietta Corporation, New York, N.Y.

[22] Filed: June 18, 1971

[21] Appl. No.: 154,378

[52] U.S. Cl............................................. 244/1 SA
[51] Int. Cl............................................. B64g 1/00
[58] Field of Search.......... 244/1 SA, 1 SS, 3, 75 R, 244/77 G, 77 SS; 74/5

[56] References Cited
UNITED STATES PATENTS

| | | | |
|---|---|---|---|
| 3,189,299 | 6/1965 | Garner et al. | 244/1 SA |
| 3,582,019 | 6/1971 | Pisacane | 244/1 SA |
| 3,637,170 | 1/1972 | Kane et al. | 244/1 SA |
| 3,643,897 | 2/1972 | Johnson, Jr. | 244/1 SA |
| 3,516,623 | 6/1970 | Sinden | 244/1 SA |

Primary Examiner—Duane A. Reger
Assistant Examiner—Jesus D. Sotelo
Attorney, Agent, or Firm—Sughrue, Rothwell, Mion, Zinn & Macpeak

[57] ABSTRACT

A system for controlling the precession of spin stabilized space vehicles, particularly those space vehicles wherein the spin axis is the principal axis of least moment of inertia. An initial precession of a spin stabilized vehicle excites various energy dissipation mechanisms causing a decrease in the vehicle's kinetic energy which results in a progressive increase in the precession angle. Excessive precession causes instability and must be controlled. Precession is controlled according to this invention by providing the space vehicle with a system which includes a sensor and control unit, the sensor providing output signals proportional to the precession angle, the control unit being energized in response to a sensor signal indicating an excessive precession angle. Energization of the control unit results in a slow decrease in the precession angle by causing kinetic energy to be returned to the vehicle.

8 Claims, 5 Drawing Figures

PATENTED MAY 21 1974  3,811,641

INVENTOR
FREDERICK W. HOPPER

BY Sughrue, Rothwell, Mion,
Zinn & Macpeak

ATTORNEYS

PRECESSION CONTROL DEVICE FOR A CLASS OF SPIN STABILIZED SPACE VEHICLES

BACKGROUND OF THE INVENTION

1. Field of the Invention

The invention is in the field of precession control systems for spin stabilized space vehicles.

2. Description of the Prior Arts

It is common practice to maintain attitude control of an axisymmetric space vehicle by means of spin. It is known that such spin stabilized vehicles possess an instability known as precession. Precession is the slow gyration of the rotation axis of a spinning vehicle about another line intersecting it so as to describe a cone. In the class of spin stabilized space vehicles wherein the spin axis is the principal axis of least moment of inertia, precession instability has been particularly acute and past attempts to provide long-term spin stabilization has proved unsatisfactory. Due to the unsatisfactory nature of prior precession control systems spin stabilized space vehicles have most often been configured such that the spin axis is the axis of greatest moment of inertia.

A prior solution to precession instability involved the use of an external reaction jet system. As disclosed in U.S. Pat. No. 3,189,299, a sensor is used to sense the precession of the spinning vehicle. The output of the sensor controls an external reaction jet to drive the precession angle to zero. Such a system suffers the disadvantage of requiring an external reaction jet system as well as additional fuel for operating this system. Further, the system suffers the disadvantage that it adversely affects the angular momentum of the vehicle.

SUMMARY OF THE INVENTION

In accordance with the teachings of this invention, long-term spin stabilization of space vehicles for which the spin axis is the principal axis of least moment of inertia is realized. A control unit, intermittently activated by a sensor unit, puts mechanical energy into vehicle system in such a way as to drive the precession angle back towards zero without affecting the angular momentum of the vehicle.

The control unit is comprised of a torque motor directly coupled to a control rotor possessing an imbalance mass with an adjustable moment arm. The axis of rotation of the control rotor as well as the axis of the torque motor coincide with the spin axis of the vehicle. The torque motor applies a small torque to the rotor thus generating a reaction torque which is applied to the stator of the motor, the stator being fixed to the vehicle. The applied torque is selected to be in a direction such that the reaction torque causes an increase in the kinetic energy of the vehicle system. The increase in kinetic energy causes a corresponding increase in the spin rate as well as a decrease in the precession angle.

DETAILED DESCRIPTION OF THE PREFERRED EMBODIMENTS

The following discussion of the preferred embodiments of the invention is given with reference to an axisymmetrical, spin stabilized space vehicle having its spin axis as the principal axis of least moment of inertia. It should, however, be understood by those skilled in the art that the invention can also be used as a conventional precession damper on vehicles for which the spin axis is the axis of greatest moment of inertia.

To better understand the details of the invention, a brief description of the torque free motion of a rigid axisymmetric vehicle spinning about its axis of symmetry and undergoing precession is given. Such motion is often referred to as Poinsot Motion. A more detailed description of this motion may be found in Introduction to Space Dynamics, Thomson W. T, John Wiley and Sons, New York 1963, pages 113 to 118.

Figure 1:
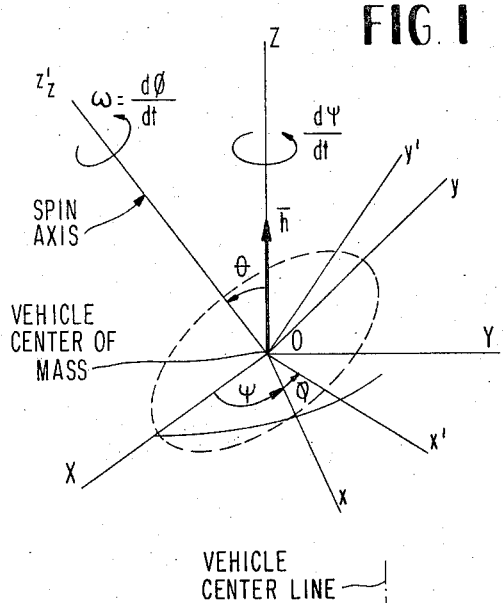
FIG. 1 illustrates the geometry of Poinsot Motion including a definition of precession frame.

The geometry of the Poinsot Motion is illustrated in FIG. 1 wherein the $x'$, $y'$ and $z'$ axes are fixed in the body and taken as principal axes at the vehicle center of mass, with $Oz'$ being the spin axis. The moment of inertia about these axes are respectively A, A and C, where A does not equal C. The Poinsot Motion consists of a precession of its spin axis about the vector $\vec{h}$, the total angular momentum associated with the motion, with a constant angle of precession $\theta$ and angular speed $d\psi/dt$.

An inertial coordinate system XYZ is defined as shown with OZ aligned along $\vec{h}$. As seen in FIG. 1, the $xyz$ frame is defined so that $Oz$ lies along the spin axis and $Ox$ lies along the intersection of the $x'y'$ and XY planes, that is, $Ox$ lies in both the $x'y'$ and the XY planes. Thus, by definition, the $xyz$ frame rotates with an angular speed $d\psi/dt$ about $Oz$, tilted at the angle of precession $\theta$ thereto. The Rotating $xyz$ frame will be referred to hereinafter as the precession frame.

Figure 2:
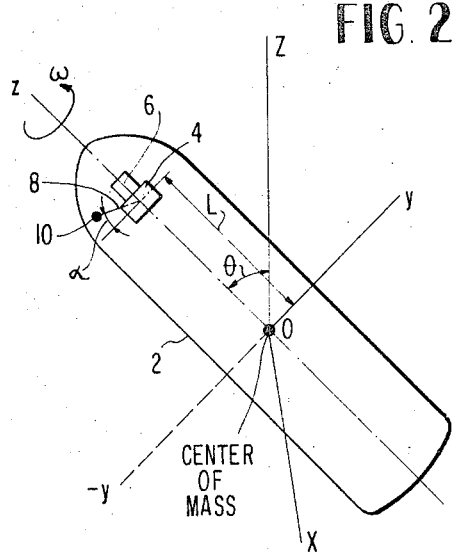
FIG. 2 illustrates a satellite including the precession control system of this invention.
Figure 4:
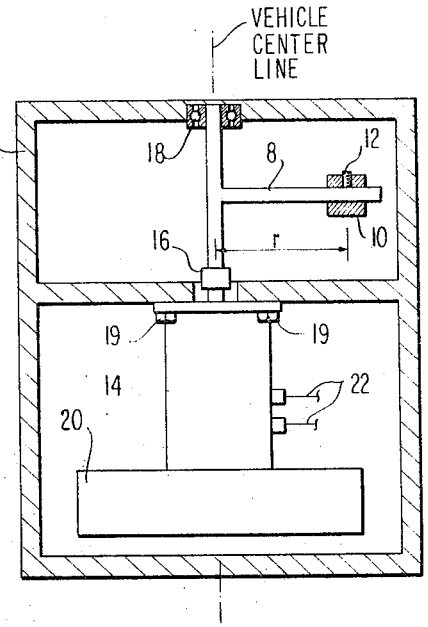
FIG. 4 illustrates the details of the control unit of the precession control system.

FIG. 2 illustrates a space vehicle 2 containing the precession control system of this invention. Control unit 4, responsive to sensor unit 6, applies a torque to rotor 8 upon which is mounted an imbalance mass 10. Although FIG. 2 illustrates the rotor 8 as being external to the control unit, it in fact may be completely enclosed therein as illustrated in FIG. 4. When the control unit, containing a suitable torque motor, is not energized the unbalanced rotor, if allowed to freely rotate about its axis will, because of the centrifugal force resulting from the vehicle precession, seek an equilibrium position in the $-y$ direction of the precession frame. Coordinate designations in FIG. 2 correspond to that of FIG. 1. If a small constant torque is exerted on the rotor about the $Oz$ axis in the direction opposite the direction of spin, the rotor will seek a new equilibrium position displaced from the $zOy$ plane by a constant angle $\alpha$. Since the vehicle is spinning relative to the precession frame, the torque motor must do work in order to maintain the constant offset angle $\alpha$. With the stator of the torque motor attached to the vehicle body the torque applied to the rotor causes a reaction torque which is applied to the vehicle body through the stator. With the motor mounted such that its axis coincides with the vehicle spin axis this reaction torque has its center about the vehicle spin axis. Therefore if the angle $\alpha$ is maintained in the direction opposite the direction of rotation, the torque motor exerts a positive reaction torque on the vehicle about its spin axis thus causing positive work to be done which results in an increase in the kinetic energy of the system. Since the axisymmetric vehicle is spinning about its principal axis of least moment of inertia, increasing the vehicle kinetic energy causes a corresponding increase in the spin rate and a slow decrease of the precession angle. The precession angle can be caused to increase in accordance with the teachings of the invention if angle $\alpha$ is selected and maintained in the direction of spin. In such a case the vehicle experiences a negative reaction torque about its spin axis thus doing work against the torque motor to dissipate energy as would a passive damper.

If used as a conventional precession damper on a vehicle having its spin axis along the axis of greatest moment of inertia the device would behave in a manner opposite to that described above. Therefore, in order to decrease the precession angle in such a vehicle, angle $\alpha$ would be maintained in the direction of vehicle spin.

Details of the control unit and the sensor unit along with the description of their operation will now be given. As illustrated in FIG. 2 the control unit 4 and sensor unit 6 are mounted within the vehicle such that they are in line and such that their common axis coincides with the vehicle spin axis. Optimum performance will be obtained when the rotor axis precisely coincides with the vehicle spin axis. Small amounts of performance deterioration may occur if the rotor axis is offset from the spin axis, since any offset results in a periodic disturbance at a frequency equal to the spin rate.

Any of various sensors which produce an output potential dependent on the precession angle may be used as sensor unit 6. For example, conventional analog accelerometers may be utilized. Whenever precession occurs, any point not on the vehicle mass center experiences a time-varying linear acceleration dependent on location, spin rate, and precession angle. By processing the output signal of a properly mounted linear analog accelerometer, the magnitude of the precession angle can be deduced.

Figure 3:
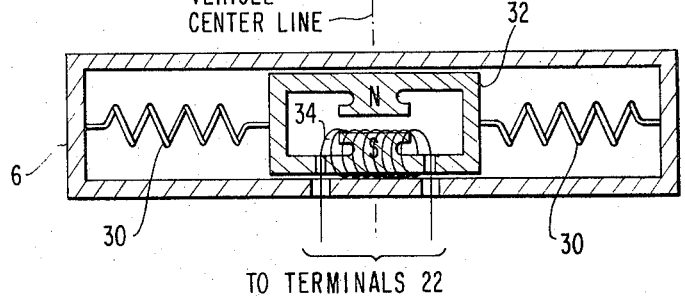
FIG. 3 illustrates the details of a sensor which may be used with the invention.

Another sensor which may be used is illustrated in FIG. 3. This sensor furnishes an alternating voltage having an amplitude nearly proportional to the precession angle and a frequency equal to the spin rate $\omega$. In operation the device generates an output signal proportional to the linear velocity of the magnetic proof mass 32. Precession of the vehicle cause the mass 32 to move, which induces in pick-up coil 34 a voltage proportional to the precession angle. For example, the sensor unit of FIG. 3 can be made to produce a sinusoidal output voltage of frequency $\omega/2\pi$ whose peak amplitude E satisfies closely the equation $$E = K_s L_s \sin 2\theta$$

where $L_s$ is the distance from the sensor to the vehicle center of mass, and $K_s$ is a constant depending on vehicle design, total angular momentum, and the characteristics of the sensor itself including the characteristics of the springs 30 constraining the mass 32.

The control unit 4, as illustrated in FIG. 4, is comprised of the rotor 8 upon which is removably mounted the imbalance mass 10. Removal of the mass or adjustment of the moment arm r is effected by mounting the mass 10 by means of screw 12. Mass position adjustability is provided so that the same unit can be used in different vehicles. For any one vehicle, the position of the mass 10, once determined, remains fixed.

Rotor 8 is coupled to torque motor 14 by means of coupler 16. The opposite end of the rotor is rotatably secured to the control unit frame 17 by means of bearing 18. To provide for inertial damping, damper unit 20 is shown coupled to torque motor 14. Although the torque motor may take the form of a conventional AC servo motor, the inertial damping sometimes provided as an option by the manufacturer is inadequate in the present application. The inertial damper will have to be sized to accommodate the moment of inertia of the control unit rotor, rather than that of the motor rotor. Sizing of the inertial damper to meet specific load requirements is well known in the art.

Operation of the precession control system will now be described. It should be remembered that the sensor and control units are mounted such that their axes are coincident with the spin axis. Further, the stator of motor 14 is coupled to the vehicle through the frame 17 to which it is directly connected, for example by bolts 19. With the vehicle spinning at a rate $\omega$ and at a precession angle $\theta$ less than some maximum allowable precession angle $\theta_2$, the sensor unit generates an output signal below that which is necessary to energize control unit 4. In this phase of operation the torque motor is deactivated and the rotor 8 is permitted to swing freely. When the precession angle increases beyond the maximum allowable angle $\theta_2$, an activation signal of a sufficient peak value to activate the motor is received at terminals 22.

Either of two modes of motor operation may be used to put mechanical energy back into the vehicle system. In accordance with the first mode of operation, upon receiving an activation signal from the sensor unit, a predetermined constant voltage is applied to the control windings of motor 14 such that its output torque remains constant and proportional to a precession angle $\theta_1$ where $\theta_1 < \theta_2$ and is the lower bound of the precession angle. When the output signal from the sensor 6 indicates that the vehicle precession angle has reduced to $\theta_1$ the torque motor is deenergized. The torque T generated in response to the control voltage may be made proportional to the precession angle $\theta_1$ by having the torque T satisfy the equation $$T = -K_T mrl \, d\psi^2/dt \, \theta_1$$

where $K_T$ is a constant slightly less than 1, mr is the first moment of the unbalanced rotor and $\theta_1$ is the lower bound of the precession angle. The negative sign denotes that the applied torque is in a direction opposite to the direction of spin.

In response to this applied torque the rotor 8 seeks an equilibrium position $\alpha$ displaced from the $zOy$ plane in the direction opposite to the direction of spin. It is noted that the power output of the torque motor must be greater than the maximum rate of vehicle energy loss when the precession angle is equal to or greater than $\theta_2$ and the control unit is inactive. The corresponding reaction torque is applied to the vehicle body causing positive work to be done on the vehicle which increases the kinetic energy thereof. As a result the precession angle slowly decreases.

When the precession angle has decreased to its lower limit $\theta_1$ the torque motor is deactivated. It is noted at this point that the associated circuitry for controlling the torque motor in response to the sensor signals is conventional and does not form a portion of this invention.

By reference to the Figures, for a constant (or very slowly varying precession angle $\theta$ and precession rate $\dot\psi$, the unbalanced rotor experiences under equilibrium conditions, i.e., when $\dot\alpha = 0$) the centrifugal force $$\vec F = -M\vec W \times (\vec W \times \vec R)$$

Here $\vec W$ is the inertial angular velocity vector defined by $\dot\psi$, M is the rotor imbalance mass, and $\vec R$ is the position vector of M within the Precession Frame. Expressed in terms of components in that frame, $$\vec w = \begin{bmatrix} 0 \\ 0 \\ \dot\psi \end{bmatrix}, \quad \vec R = \begin{bmatrix} \cos\Theta & 0 & \sin\Theta \\ 0 & 1 & 0 \\ -\sin\Theta & 0 & \cos\Theta \end{bmatrix} \begin{bmatrix} r\cos\alpha \\ r\sin\alpha \\ L \end{bmatrix}$$

With these values for $\vec W$ and $\vec R$, the centrifugal force expression reduces to $$\vec F = m\dot\psi^2 \begin{bmatrix} r\cos\Theta\cos\alpha + L\sin\Theta \\ r\sin\alpha \\ 0 \end{bmatrix}$$

The moment experienced by the rotor imbalance mass as a result of F is $$\vec M = \vec R \times \vec F$$

Expanding this with the above values of $\vec F$ and $\vec R$, and resolving into components along and normal to the vehicle spin axis, that component of $\vec M$ lying along $Oz'$ (which is also the axis of rotation of the control device) is readily found to be $$M_{z|} = -1/2\, ML\, \dot\psi^2 \sin 2\theta \sin\alpha\, [1 - r/L \tan\theta \cos\alpha]$$

where $M = mr$, the first moment of mass of the unbalanced rotor, and L is its displacement along the vehicle spin axis from the spacecraft center of mass.

For applications of practical interest, r is significantly less than L and $\theta$ is small (e.g. 35° or less), in which case $|M_{z|}|$ assumes a maximum value slightly greater than $$1/2\, ML\, \dot\psi^2 \sin 2\theta$$

at a value of $|\alpha|$ slightly greater than 90°. Since the motor must provide a torque equal and opposite to $M_{2|1}$ in order to maintain the desired equilibrium, constraining that torque to lie between $-1/2\, ML\, \dot\psi^2 \sin 2\theta$ and $+1/2\, ML\, \dot\psi^2 \sin 2\theta$ assures that equilibrium. A motor torque outside that range will exceed the maximum $M_{z|}$ possible and the device will spin uncontrolled, with no useful end result.

In the second mode of operation the torque motor is caused to operate such that its output torque varies as a function of the precession angle. This is accomplished by making the motor control voltage a function of (e.g. simply proportional to) the peak sensor output. Thus, as the precession angle descreases the torque level is reduced and at some lower limit $\theta_1$ the motor is deactivated.

Results of the application of the above described precession control system as applied to a specific space vehicle configuration will now be given by way of example. It is to be understood that the ensuing example is given for illustration purposes only and is not intended to be limiting upon the invention.

The space vehicle is generally cylindrical in shape with a 4 foot diameter, weighting 2,000 pounds and being 10 feet in length. The principal moments of the vehicle are C = 124.2 slugs/ft² about its spin axis and A = 580 slugs/ft² about a transverse axis through the center of mass. The initial spin rate of this vehicle, assuming zero precession, is given as 50 revolutions per minute (rpm).

The torque motor 14 is a standard miniature servo motor, for example a Kearfott model J-126-06 (size 5) servo motor. The weight of such a motor is 0.68 ounces with a stall torque of 0.12 inch-ounce (max.) and a power input of 1.7 watts at maximum stall torque. The control rotor is located at a distance 1 = 4.5 ft. from the vehicle center of mass. The imbalanced mass weighs 1.14 ounces and is positioned such that the radius arm r = 6 inches.

Figure 5:
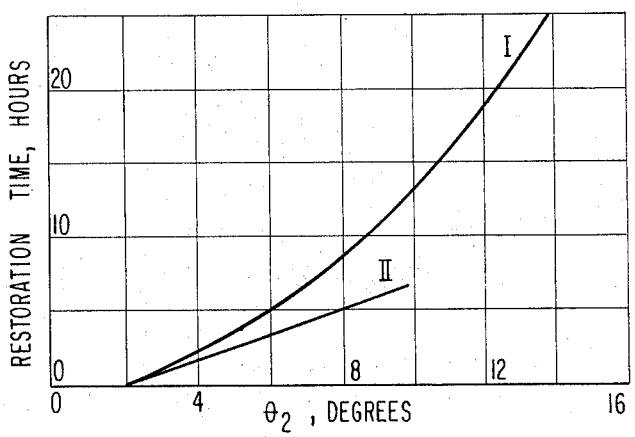
FIG. 5 is a typical graph of the precession angle restoration time versus maximum allowable precession angles $\theta_2$.

Utilizing the first mode of operation described previously, activation of the torque motor 14 causes the motor to generate a constant control torque until the precession angle has reduced to the lower limit $\theta_1$. With $\theta_1$ taken as 2°, in the presence of a −0.04 oz. in. torque at 40 rpm the time required to decrease the precession angle to $\theta_1$ from varying values of $\theta_2$ is shown on curve I of FIG. 5. As can be seen from this curve it takes approximately 24 hours for the device to drive the precession angle from 14° back to 2°.

When operating in the second mode, that is when the torque generated is a function of the precession angle the cycling time can be reduced. Operation in the second mode can be accomplished without physically changing the device. For example, if the torque is selected such that at a spin rate of 40 rpm the torque is equal to −0.012 × $\theta$ inch-ounces the time required to drive the precession angle back to 2° from various precession angles $\theta_2$ is shown by curve 2 in FIG. 5. The 10° limit for $\theta_2$ illustrated in FIG. 5 results from the limitations of the torque motor used. The range can be extended beyond 10° by using a larger torque motor.

Although the invention has been described with respect to the preferred embodiments thereof it is understood by those skilled in the art that various modifications can be made in construction and arrangement within the scope of the invention as defined in the claims.

What is claimed:

1. A precession control device for a symmetric spin stabilized space vehicle comprising:
    an imbalance mass adjustably coupled to a rotor arm having one end rotatably connected to said vehicle and having an axis of rotation coincident with the vehicle spin axis, said rotor arm being rotatable about said axis of rotation independently of the vehicle spin and forming a moment arm for said mass, said mass attaining a first equilibrium position in response to the spin of the vehicle and
    means connected to said rotor arm for generating a torque to cause said imbalance mass to seek a second equilibrium position removed from said first equilibrium position in response to a precession angle greater than a predetermined value, said torque generating means producing a reaction torque to increase the vehicle kinetic energy to thereby decrease the precession angle.

2. The device of claim 1 wherein said torque generating means comprises a constant torque motor.

3. The device of claim 1 wherein said torque generating means comprises a variable torque motor whose torque is varied as a function of the precession angle.

4. The device of claim 1 wherein said torque generating means comprises a sensor means for generating an output signal substantially proportional to the precession angle, and drive means coupled to said rotor arm and responsive to the output from said said sensor means above a predetermined value for causing said rotor arm to rotate an angular distance to move said imbalance mass to said second equilibrium position.

5. The device of claim 4 wherein said drive means comprises a torque motor, the axis of rotation of which is in line with the spin axis of the vehicle, the rotor of said motor being coupled to said rotor arm and the stator of said motor being coupled to the vehicle body whereby, said motor generates a torque causing said rotor arm to seek its second equilibrium position in response to a signal from said sensor means above a predetermined value, said torque causing a reaction torque to be applied to said vehicle through said stator to increase the kinetic energy of the vehicle thereby causing a decrease in the angle of precession.

6. The device of claim 5 wherein said torque motor produces a varying torque proportional to the angle of precession in response to said sensor output signal.

7. The device of claim 5 wherein said sensor means is a linear accelerometer mounted on said vehicle with its axis of rotation in line with the vehicle spin axis.

8. The device as in claim 1, wherein said generating means comprises a variable torque motor and means for varying the torque of said motor such that the torque output of said torque motor lies between the values of $$-1/2 \, ML \, d\psi^2/dt \, \sin 2\theta \text{ and } +1/2 \, ML \, d\psi^2/dt \, \sin 2\theta,$$

where $M =$ the first moment of mass of the unbalanced rotor about the axis of rotation;

$L =$ the displacement of the unbalanced rotor and mass along the vehicle spin axis from the center of mass, $d\psi^2/dt =$ the angular rate of precession, and $\theta =$ the prevailing angle of precession.

* * * * *